United States Patent [19]

Schoenheimer et al.

[11] Patent Number: 4,492,219
[45] Date of Patent: Jan. 8, 1985

[54] VALVE AND SYSTEM INCORPORATING SAME

[75] Inventors: Marcus F. Schoenheimer, Indooroopilly; Lionel A. Gaskell, Bracken Ridge; Keith A. Ackermann, Lawnton, all of Australia

[73] Assignee: Actrol Industries Pty. Ltd., Australia

[21] Appl. No.: 481,564

[22] Filed: Apr. 1, 1983

[30] Foreign Application Priority Data

Apr. 6, 1982 [AU] Australia .............................. PF3499

[51] Int. Cl.³ .................................................. F24J 3/02
[52] U.S. Cl. .................................. 126/427; 236/93 R; 236/100
[58] Field of Search .................... 236/93 R, 93 A, 100, 236/99 K, 99 J, 12.16; 237/8 C; 126/427

[56] References Cited

U.S. PATENT DOCUMENTS

| 2,475,540 | 7/1949 | Birchfield | 236/12.16 |
| 3,019,986 | 2/1962 | Schoerner | 236/93 A X |
| 3,680,022 | 7/1972 | Bright | 236/100 X |
| 3,961,606 | 6/1976 | Wong | 123/41.12 |
| 4,036,433 | 7/1977 | Wagner | 236/100 |
| 4,191,172 | 3/1980 | Walch, Jr. et al. | 126/427 X |
| 4,288,031 | 9/1981 | Hass | 236/93 A X |
| 4,299,354 | 11/1981 | Ketley | 236/12 A |
| 4,375,873 | 3/1983 | Enomoto et al. | 236/100 X |
| 4,410,133 | 10/1983 | Furukubo | 236/100 X |

FOREIGN PATENT DOCUMENTS

| 330412 | 6/1976 | Austria | 236/42 |
| 0029129 | 5/1981 | European Pat. Off. | 236/86 |
| 0063237 | 10/1982 | European Pat. Off. | 236/93 |
| 3118904 | 2/1982 | Fed. Rep. of Germany | 236/93 |
| 1591230 | 6/1981 | United Kingdom | 236/93 |

*Primary Examiner*—William E. Tapolcai
*Attorney, Agent, or Firm*—Berman, Aisenberg & Platt

[57] ABSTRACT

A temperature responsive valve having a primary inlet, secondary inlet and an outlet, in which the two inlets communicate with one another through a chamber within the valve body and communicate with the outlet through an orifice controlled by a valve member. A temperature responsive device is mounted within the primary inlet and is connected to the valve member so as to move that member into an orifice closing position when the temperature of fluid entering the primary inlet exceeds a predetermined temperature. A deflector located within the valve body functions to influence the flow of fluid entering the valve through the secondary inlet so that it is directed away from the outlet and towards the primary inlet. The invention is also concerned with a solar heating system incorporating such a valve in which a storage tank outlet is connected to the primary inlet, a cold water supply is connected to the secondary inlet and the inlet side of the solar heating panel is connected to the valve outlet.

12 Claims, 7 Drawing Figures

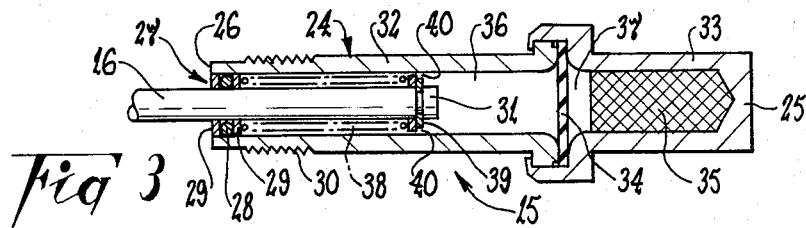
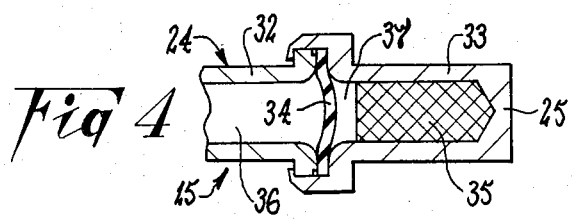
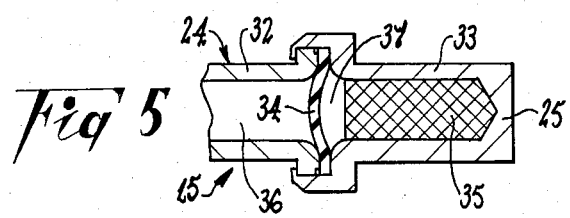
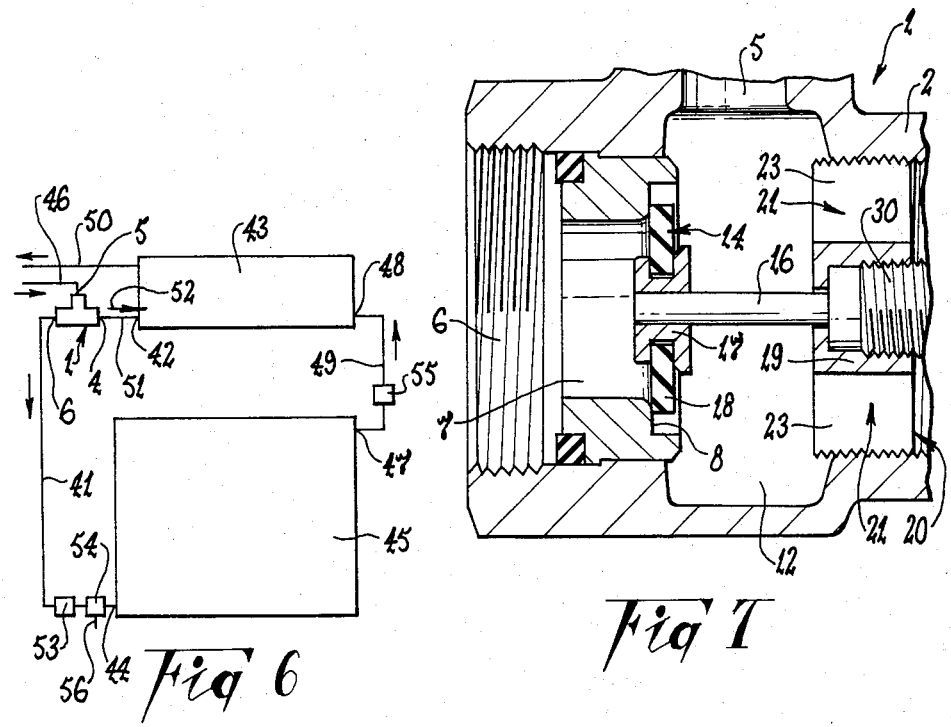

VALVE AND SYSTEM INCORPORATING SAME

This invention relates to a valve for closing a fluid circulating loop in response to fluid temperature rising to a predetermimed level. The invention is also concerned with a fluid heating system of the type having a fluid circulating loop which can be tapped to draw off fluid and means whereby fluid can be replaced from an external source.

The valve has been particularly designed for use in a thermo-syphon water heating system in which water circulates by convection, but it is not limited to that use. Such a water heating system includes a solar heating panel and a storage tank located at a higher level than the heating panel and connected to the upper end of the heating panel to receive heated water therefrom. A feedback line is also connected between the storage tank and the lower end of the heating panel so that water can circulate throughout the system by convection. In such a system water can be drawn from the storage tank and a source of replenishment water is connected to the system, usually by way of the aforementioned feedback line. Problems may arise in such a system if the water in the storage tank exceeds a predetermined temperature and that may occur if heated water is continually being introduced into the storage tank from the heating panel under the convection flow.

Accordingly, it is an object of the present invention to provide a valve for closing a fluid circulating loop in response to the fluid temperature rising to a predetermined level. It is a further objects of the invention to provide an improved fluid heating system which includes such a valve. Still another object of the invention is to provide an improved temperature responsive probe for use with a valve of the aforementioned kind, but which is also usable in other circumstances.

Although the valve according to the present invention will be hereinafter particularly described for use in a hot water system it will be appreciated that the valve may be used in other situations where it is desirable to stop flow if the fluid temperature rises to the predetermined level.

According to one aspect of the present invention there is provided a temperature responsive valve including, a hollow body, a chamber defined within said body, a primary inlet port and a secondary inlet port, each communicating with said chamber so as to be in continual communication with one another, an orifice within said chamber, an outlet port communicating with said chamber through said orifice, a valve member mounted within said body for movement towards and away from a position at which it closes said orifice, and a temperature responsive means being located within or adjacent said primary inlet port.

According to another aspect of the present invention there is provided a fluid heating system including a storage container, a fluid circulating loop having opposite ends respectively connected to an outlet and an inlet of said container, fluid heating means within said loop, means for drawing fluid from said container, a valve as described above connected into said loop between said heating means and said container outlet, said primary inlet port being connected to said container outlet, said outlet port being connected to that part of said loop leading to said heating means, and a source of said fluid connected to said secondary inlet port.

According to a further aspect of the invention there is provided a temperature responsive element including, a tubular body closed at one end and having an opening at the opposite end thereof, sealing means defining said opening, a rod projecting into the bore of said body through said opening and slidably engaging said sealing means, said rod having a cross sectional size substantially less than that of said bore, a resilient diaphragm extending transverse of said tubular body and dividing the interior thereof into two compartments, a temperature responsive medium within the compartment between said diaphragm and said closed end thereof, and a body of fluid within the other said compartment.

The essential features of the invention, and further optional features, are described in detail in the following passages of the specification which refer to the accompanying drawings. The drawings however are merely illustrative of how the invention might be put into effect, so that the specific form and arrangement of the features (whether they be essential or optional features) shown is not to be understood as limiting on the invention.

In the drawings:

FIG. 3 is a cross sectional view of one form of temperature responsive device for use in the valve as shown in FIG. 1;

FIG. 4 is a view similar to FIG. 3 but showing the device in a "cold" condition;

FIG. 5 is a view similar to FIG. 4 but showing the device in a "hot" condition;

FIG. 6 is a diagrammatic view of a hot water circuit including a valve as shown in FIG. 1;

FIG. 7 is a view similar to FIG. 2 but showing another form of the valve.

Figure 1:
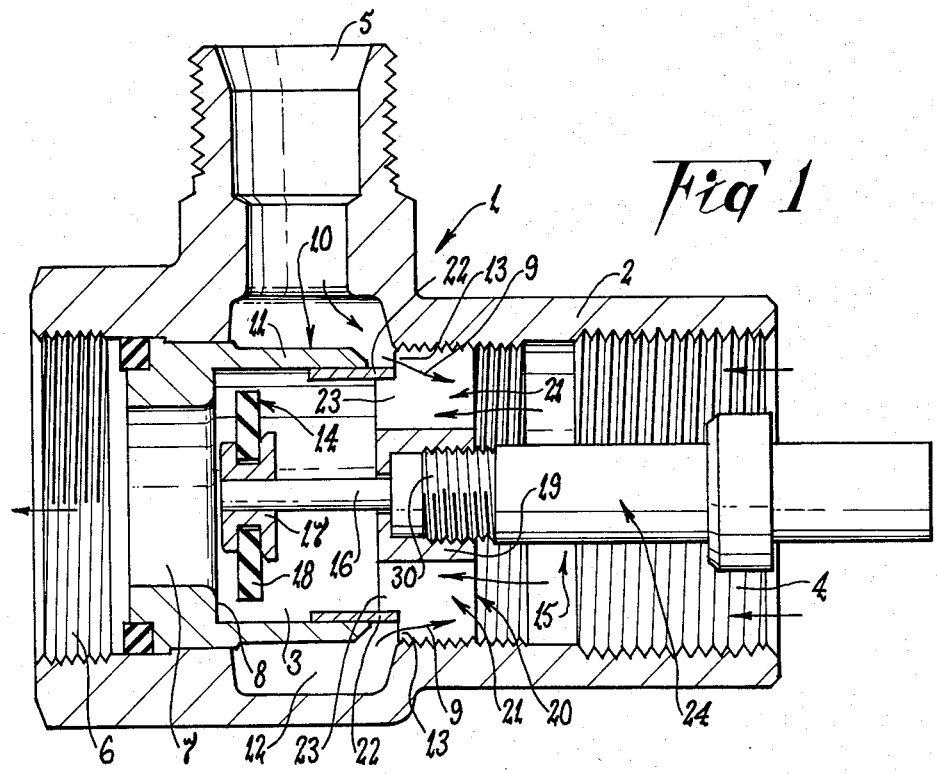
FIG. 1 is a cross sectional view of one form of valve incorporating an embodiment of the invention and showing the valve in an open condition.
Figure 2:
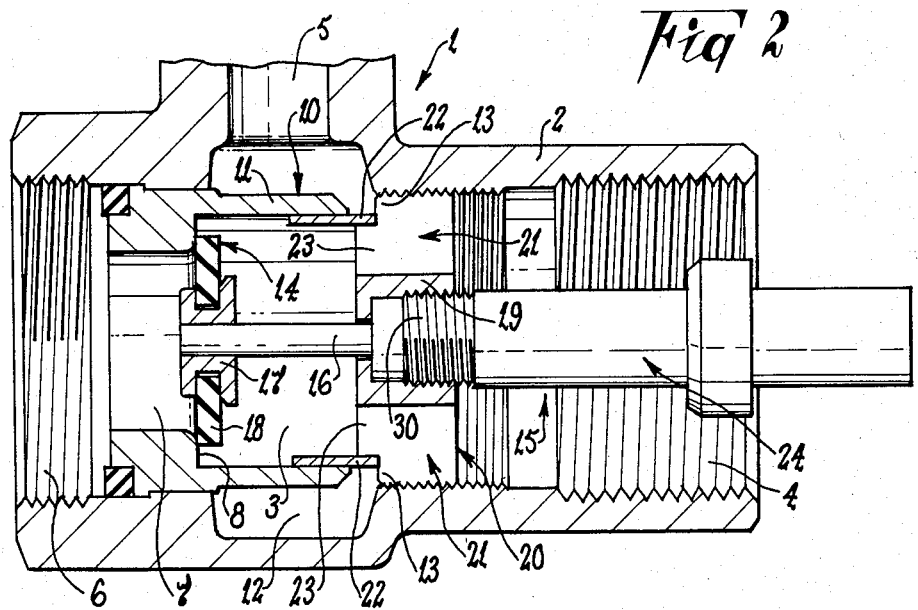
FIG. 2 is a view similar to FIG. 1 but showing the valve in closed condition.

The example valve 1 as shown in FIGS. 1 and 2 includes a hollow body 2 having a chamber 3 defined therein and a primary inlet port 4 and a secondary inlet port 5, both of which communicate with the chamber 3. In the preferred arrangement shown, the two inlet ports 4 and 5 are arranged at substantially 90° relative to one another, but such a relationship is not essential. An outlet port 6 is also provided in the valve body 2 and that communicates with the chamber 3 by way of an orifice 7 having a valve seat 8 associated therewith. It is further preferred, as shown, that the primary inlet port 4 and the outlet port 6 are in substantial alignment so that there is a substantially straight path of flow from one to the other.

The secondary inlet port 5 communicates with the valve chamber 3 from one side of the valve body 2 and it is a feature of the construction shown that fluid entering the valve 1 through the port 5 is deflected away from the outlet port 6 as indicated by arrows 9 in FIG. 1. In the particular form shown, the valve 1 includes a deflector 10 which blocks direct access between the secondary inlet port 5 and the outlet port 6 and which also induces the fluid entering by way of the secondary inlet port 5 to flow in a direction towards the primary inlet port 4.

According to the embodiment shown, the deflector 10 includes a cylindrical sleeve-like member 11 which is a press fit or is otherwise secured within the valve body 2 to be substantially coaxial with the outlet port 6. The sleeve 11 extends from adjacent the outlet port 6 towards the primary inlet port 4 and it is generally convenient to form the valve orifice 7 within the sleeve 11. In the example shown, the internal diameter of the sleeve 11 is reduced adjacent the outlet port 6 and the step so formed provides the valve seat 8.

The secondary inlet port 5 preferably enters the valve body 2 at a location such that its axis is transverse to and intercepts the sleeve 11 as shown, and that port 5 communicates with an annular chamber 12 surrounding the end portion of the sleeve 11 remote from the outlet port 6. Fluid is unable to escape from that annular chamber 12 except by way of an opening 13 adjacent to the terminal end of the sleeve 11 located remote from the outlet port 6. As a result, fluid entering the annular chamber 12 from the secondary inlet port 5 is deflected to flow in a direction towards the primary inlet port 4.

The valve 1 also includes temperature responsive means arranged to close communication between the inlet ports 4 and 5 and the outlet port 6 in response to the temperature of the fluid flowing through the valve 1 rising to a predetermined level. The temperature responsive means includes a valve member 14 mounted in the valve body 2 for movement towards and away from the valve seat 8, and a temperature responsive probe 15 connected to the valve member 14 and being operative to cause that movement of the valve member 14. The valve member 14 as shown includes an elongate stem 16, an enlarged head portion 17 secured to an end of that stem 16 and a resilient element 18 carried by the head portion 17 so as to be engagable with the valve seat 8. The stem 16 slidably passes through a boss 19 forming part of a mounting member 20 which is located between the primary inlet port 4 and the valve orifice 7, and that mounting member 20 has passages 21 through which the inlet port 4 communicates with the valve orifice 7 and the secondary inlet port 6.

It is generally convenient to form the mounting member 20 something in the manner of a spoked wheel or star with the passages 21 being defined between the spokes. The function of the deflector 10 may be improved by providing a cylindrical collar 22 between the sleeve 11 and the mounting member 20. That collar 22 is arranged coaxial with the sleeve 11 and preferably locates neatly or firmly within the adjacent end of the sleeve 11. Portion of the collar 22 projects beyond that end of the sleeve 11 end and engages or is secured to the mounting member 20 at a location such as to divide the passages 21 into radially inner and outer parts 23 and 13 respectively. At least, such a division occurs at the ends of the passages 21 adjacent to the sleeve 11. The outer passage part constitutes the opening 13 and provides communication between the two inlet ports 4 and 5. whereas the inner passage port 23 provides communication between the primary inlet port 4 and the orifice 7.

The temperature responsive probe 15 as shown in FIGS. 3 to 5, includes an elongate tubular body 24 which is closed at one end 25 and has an opening at its opposite end 26. The opening is preferably defined by sealing means 27 comprising a resilient O-ring 28 interposed between two annular supports 29 which may be made of PTFE or any other suitable material. The valve member stem 16 extends into the tubular body 24 through the open end 26 and it is preferred that the annular supports 29 slidably engage the stem 16 to enhance the sealing effect. The open end portion 30 of the tubular body 24 may be attached to the mounting member boss 19 by a screw thread as shown, or other means.

so that the probe body 24 is substantially coaxial with the valve orifice 7. The arrangement is such that the inner terminal portion 31 of the valve stem 16 in effect constitutes a piston of the temperature responsive probe 15.

It is preferred to form the tubular body of the probe in two parts 32 and 33 as shown, which will be hereinafter referred to as a cylinder part 32 and a closure part 33 respectively. The cylinder part 32 is open ended and is the part adjacent the mounting member 20 and is also the part which contains the piston portion 31 of the valve stem 16. The two parts 32 and 33 are secured end to end in any appropriate fashion and a resilient diaphragm 34 extends transverse of the body 24 to divide the interior thereof into two compartments. That is the diaphragm 34 separates the interior of one part 32 from the interior of the other part 33. Wax 35 or other heat responsive medium is contained within the closure part 33, whereas a body 36 of suitable fluid is contained within the cylinder part 32. Some fluid 37 might also be contained in the closure part 33 as a result of loading the slug of wax 35 into that part 33 while it is full of fluid, in which the bulk of the fluid is displaced during the loading process but some will remain. That type of loading process is designed to eliminate air pockets within the closure part 33 of the probe 15.

When the two probe parts 32 and 33 are secured together and the probe 15 is in the "cold" retracted condition, it is preferred that the diaphragm 34 is biased to one side as shown in FIG. 4 so that it is convex on the side facing the closed end 25 of the probe 15. The arrangement is such that the diaphragm 34 in effect moves across-centre in response to expansion of the wax 35 during heating of the probe 15, as shown in FIG. 5.

It is preferred that the wax 35 is selected to have a melting point close to the temperature at which the valve 1 is designed to close. The reason is that the rate of volumetric expansion of wax 35 increases as the melting point is approached and consequently that condition produces relatively fast closing movement of the valve 1.

Spring means preferably urges the valve member 14 away from the valve seat 8 and in the construction shown that means includes a coil compression spring 38 located within the probe body 24 and surrounding the valve stem 16. That spring 38 acts between the seal 27 and a flange 39 releasably connected to the valve stem 16 near its terminal end. A clearance space 40 exists between the periphery of the flange 39 and the surrounding surface of the probe body 24 so as to allow passage of fluid. It is preferred that the valve stem 16 has a diameter substantially less than that of the bore of the probe body 24 for a reason hereinafter made clear. The spring 38 may have an added function of pressing the adjacent annular support 29 of the sealing means 27 against the O-ring 28 so as to compress it axially and thereby improve the sealing effect.

With the arrangement described, the temperature responsive probe 15 is located adjacent to and preferably projects through the primary inlet port 4. As a consequence, the probe 15 responds to the temperature of fluid entering the valve 1 through the primary inlet port 4. When the fluid temperature reaches the predetermined level, the wax 35 expands to push the diaphragm 34 towards the valve stem 16 which is thereby moved outwards a sufficient amount for the valve member 14 to engage the valve seat 8. The valve orifice 7 is thereby closed so preventing fluid flow from the valve chamber 3 into the outlet port 6.

Because of the size differential between the cross-sections of the valve stem 16 and the bore of the probe body 24, the stem 16 tends to magnify the expansion or contraction of the wax 35. That is, the valve stem 16 must move to compensate for changes in the volume of the wax 35 and the change in displaced volume of the stem 16—i.e., the volume of liquid displaced by the stem 16—must be the same as the change in actual volume of the wax 35. In view of the smaller cross sectional size of the valve stem 16 it must then move through a greater axial distance than the wax 35 during any such change of volume. That magnifying effect is a valuable advantage in installations requiring sensitive response to temperature changes. For example, a valve 1 as described may move from the fully open position to the fully closed position in a temperature range of approximately 4° C.

The probe 15 described above has the particular advantage that melting and subsequent solidification of the wax 35 will not adversely affect operation of the probe 15. The physical separation of the wax 35 from the moving components of the probe 15 is a relevant factor in that regard.

The secondary inlet port 5 is arranged to communicate with the valve chamber 3 at a location upstream of the valve orifice 7 so that its communication with the primary inlet port 4 is not affected by closure of the orifice 6.

An example water heating system incorporating a valve 1 as described, is shown in FIG. 6. In that example, the valve 1 is installed in a water feedback line 41 which extends from an outlet 42 of a storage container 43 to an inlet 44 of a solar heating panel 45. The primary inlet 4 of the valve 1 is connected to the container outlet 42 and the valve outlet 6 is connected to the panel inlet 44. A source of water is connected to the secondary inlet 5 of the valve 1 through a make-up line 46. An outlet 47 of the panel 45 is connected to an inlet 48 of the storage container 43 through a feed line 49, and water may be drawn from the system through a take-off line 50 connected to the container 43. The feedback line 41, panel 45 and feed line 49 constitute a water circulation loop of the system.

When the temperature of the water within the system reaches a predetermined level, the temperature responsive probe 15 functions to cause the valve orifice 7 to be closed thereby preventing further circulation of water through the circulation loop 41, 45 49. If water is then tapped from the system through the take-off line 50, replenishment water will flow into the valve 1 by way of make-up line 46 and will pass through the valve primary inlet 4 to enter the storage container 43 by way of its outlet 42. As a consequence the replenishment water, which is relatively cool, will flow over the temperature responsive probe 15 and may cause it to cool sufficiently to lift the valve member 14 from the valve seat 8 and thereby enable some flow through the circulation loop 41, 45, 49 under convective force. The convective force is relatively weak however, and the solar heating panel 45 provides greater resistance to flow than does the section 51 of the feed-back line 41 adjacent to the storage container 43. Consequently most of the replenishment water will continue to flow out of the valve 1 through the primary inlet port 4 as shown by arrow 52 in FIG. 6, and the remainder will leave by way of the outlet port 6. Cessation of tapping through take-off line 50 will enable convective flow to predominate so allowing the circulation loop 41,45,49 to operate normally. The valve orifice 7 will remain open until feed-back water from the storage container 43 again rises to the predetermined temperature.

A valve according to the present invention may be used in a system of the kind disclosed in Australian Patent Application No. 74447/81 and that disclosure is to be understood as being imparted into the present specification by cross-reference. Such a system would then combine the fluid high temperature closing function as herein described with a low temperature closing function and a low temperature drainage function. That is, the system would include three further temperature responsive valves 53,54 and 55 as shown in FIG. 6. Valves 53 and 55 are arranged to close and thereby isolate the panel 45 from the container 43 when the temperature of the water in the panel 45 falls below a first predetermined low temperature. The valve 54 is operative to open the panel 45 to drain 56 when the water temperature falls below a second predetermined low temperature which is less than the first mentioned temperature, but preferably greater than that .t which water freezes. The valves 53 and 54 can be arranged in a single unit if required.

The valve 1 need not always have a deflector 10 as described. The arrangement shown in FIG. 7 will be satisfactory under some circumstances and that arrangement is the same as shown in FIG. 1 save for the ommision of the deflector 10.

It will be clear from the foregoing description that the present invention provides a simple yet effective valve for guarding against overheating of a fluid system. The valve particularly described is sensitive to small temperature changes and is therefore ideally suited for solar water heating systems.

Various alterations, modifications and/or additions may be introduced into the constructions and arrangements of parts previously described without departing from the spirit or ambit of the invention as defined by the appended claims.

Having now described our invention what we claim as new and desire to secure by Letters Patent is:

1. A temperature responsive valve including: a hollow body, a chamber defined within said body, a primary inlet port and a secondary inlet port, each communicating with said chamber so as to be in continual communication with one another, an orifice within said chamber, an outlet port communicating with said chamber through said orifice, a valve member mounted within said body for movement towards and away from a position at which it closes said orifice, temperature responsive means connected to said valve member and being operative to control said movement thereof, said temperature responsive means being located within or adjacent said primary inlet port, and, within said valve body, deflector means to influence the flow of fluid entering the valve through said secondary inlet port so that it is directed away from said outlet port and towards said primary inlet port.

2. A valve according to claim 1, wherein said primary inlet port and said outlet port are in substantial alignment, the axis of said secondary inlet port is generally transverse to the axis of said outlet port, and said deflector intervenes between said secondary inlet port and said orifice to prevent flow directly from said secondary inlet port to said orifice.

3. A valve according to claim 1, wherein said deflector is a cylindrical sleeve arranged substantially coaxial with said orifice and extending from the orifice in a direction towards the primary inlet port, the external surface of said sleeve is exposed to fluid entering said valve through said secondary inlet port, said valve member is located within said sleeve, and an opening is provided adjacent the end of said sleeve remote from said orifice through which said secondary inlet port communicates with said chamber and said primary inlet port.

4. A valve according to claim 3, wherein the end portion of said sleeve remote from said opening has a reduced internal diameter which forms said orifice.

5. A valve according to claim 3, wherein said temperature responsive means is supported by a member located between said sleeve and said primary inlet port, a cylindrical collar extends between said member and said sleeve, and said opening is provided at the end of said collar adjacent said member.

6. A valve according to claim 1, wherein a valve seat surrounds said orifice, and said valve member includes a resilient element which is engageable with said valve seat to close said orifice and a stem to which said resilient element is connected and which is arranged substantially coaxial with said orifice.

7. A valve according to claim 6, wherein said temperature responsive means includes a cylindrical tubular body, a piston mounted within said body for movement longitudinally thereof; and a temperature responsive medium within said tubular body and which expands and contracts in response to temperature variations to influence the axial position of said piston within said tubular body, and said stem is connected to said piston, and spring means urges said valve member away from the orifice closed position.

8. A valve according to claim 7, wherein said stem is formed integral with said piston and projects into said tubular body through an opening in one end thereof, said one end is attached to a mounting member having at least one passageway through which said primary inlet port communicates with said secondary inlet port and said orifice, and said tubular body extends from one side of said mounting member towards said primary inlet port and said valve member is located on the opposite side of said mounting member.

9. A valve according to claim 8, wherein said stem slidably locates within a seal at said one end of the tubular body, and said stem has a cross sectional size less than that of the bore of said tubular body so that expansion or contraction of said medium is magnified by the longitudinal movement of said stem.

10. A fluid heating system including: a storage container; a fluid circulating loop having opposite ends respectively connected to an outlet and an inlet of said container; fluid heating means within said loop; means for drawing fluid from said container; a temperature responsive valve connected to said loop between said heating means and said container outlet and including a hollow body, a chamber within said body, a primary inlet port which is connected to said container outlet, a secondary inlet port, each of said inlet ports communicating with said chamber so as to be in continual communication with one another, an outlet port communicating with said chamber through an orifice within said body and being connected to that part of said loop which leads to said heating means, a valve member mounted within said body for movement towards and away from a position at which it closes said orifice, and a temperature responsive means located within or adjacent said primary inlet port and connected to said valve member so as to control said movement thereof; and a source of said fluid connected to said secondary inlet port.

11. A system according to claim 10, wherein said heating means is a solar heating panel.

12. A system according to claim 10, wherein two additional temperature responsive valves are operable to close and isolate said heating means from said container when the temperature of the fluid within said loop falls below a first predetermined low temperature, and a drain valve is operative to connect said heating means to drain when the temperature of the fluid within said loop falls below a second predetermined low temperature which is lower than said first predetermined low temperature but greater than that at which said fluid freezes.

* * * * *